(12) United States Patent
Winn

(10) Patent No.: US 9,916,400 B1
(45) Date of Patent: Mar. 13, 2018

(54) USER DEFINED OBJECT PUSHER FOR MULTI-USER CAX ENVIRONMENT

(71) Applicant: United Technologies Corporation, Hartford, CT (US)

(72) Inventor: Joshua Daniel Winn, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 501 days.

(21) Appl. No.: 14/620,573

(22) Filed: Feb. 12, 2015

(51) Int. Cl.
*G06G 7/48* (2006.01)
*G06F 17/50* (2006.01)
*G06F 3/0484* (2013.01)
*G06F 9/44* (2018.01)

(52) U.S. Cl.
CPC ............ *G06F 17/50* (2013.01); *G06F 3/0484* (2013.01); *G06F 9/4428* (2013.01)

(58) Field of Classification Search
CPC .... G06F 17/50; G06F 17/5004; G06F 17/005; G06F 9/547; G06F 17/5018; G06F 17/30557; G06F 9/4443; G06F 17/30424
See application file for complete search history.

(56) References Cited

U.S. PATENT DOCUMENTS

| | | | |
|---|---|---|---|
| 8,229,715 B1 | 7/2012 | Teller et al. | |
| 8,566,066 B2 | 10/2013 | Thompson et al. | |
| 8,752,075 B1 * | 6/2014 | Lee | G06F 9/547 |
| | | | 709/203 |
| 2002/0012007 A1* | 1/2002 | Twigg | G06F 17/50 |
| | | | 345/677 |
| 2002/0016697 A1* | 2/2002 | Nishigaki | G06F 17/5018 |
| | | | 702/183 |
| 2008/0306994 A1* | 12/2008 | Leng | G06F 9/4428 |
| 2011/0145689 A1* | 6/2011 | Campbell | G06F 17/248 |
| | | | 715/209 |
| 2011/0276908 A1* | 11/2011 | O'Riordan | G06F 9/4443 |
| | | | 715/763 |
| 2012/0281013 A1* | 11/2012 | Mahdavi | G06F 17/50 |
| | | | 345/619 |

(Continued)

FOREIGN PATENT DOCUMENTS

WO WO 2014/194066 A1 * 12/2014 ............. G06T 15/00

OTHER PUBLICATIONS

Hwang et al., "An XML-Based 3-Dimensional Graphic Database System", The Human SBociety and Internet, Jul. 2001.*

(Continued)

*Primary Examiner* — Kandasamy Thangavelu
(74) *Attorney, Agent, or Firm* — Carlson, Gaskey & Olds, P.C.

(57) ABSTRACT

A system for collaborating on a component according to an example of the present disclosure includes, among other things, a computing device configured to execute a first multi-user CAx environment including a data module and an import module. The data module is configured to access a database relating to a component design. The component design relates to a group of function-based commands. The import module is configured to cause a user defined object to be imported into the first multi-user CAx environment in response to the user defined object being located based on an identifier. The user defined object relates to the component design.

20 Claims, 4 Drawing Sheets

(56) References Cited

U.S. PATENT DOCUMENTS

| | | | | |
|---|---|---|---|---|
| 2013/0144566 A1* | 6/2013 | De Biswas | ............ | G06T 17/005 703/1 |
| 2014/0214368 A1* | 7/2014 | Loberg | ................ | G06F 17/5004 703/1 |
| 2014/0222387 A1 | 8/2014 | Cannon et al. | | |
| 2014/0222919 A1 | 8/2014 | Nysetvold et al. | | |
| 2014/0236550 A1* | 8/2014 | Nysetvold | ................ | G06F 17/50 703/2 |
| 2015/0186457 A1* | 7/2015 | Enomoto | .......... | G06F 17/30424 707/769 |
| 2016/0071320 A1* | 3/2016 | Smith | .................. | G06T 19/006 345/633 |
| 2016/0085418 A1* | 3/2016 | Kling | ................ | G06F 17/30557 715/771 |

OTHER PUBLICATIONS

Gong et al., "CBAbench: An AutoCAD-based Dynamic Geometric Constraint System", 2009.*

Liu et al., "Research on remote sensing image pixel attribute data acquisition method in AutoCAD", Proceedings of SPIE, 2013.*

Hepworth et al., "Scalable Integration of Commercial File Types in Multi-User CAD", Feb. 2014.*

Chunlei Li, "Ontology-Driven Semantic Annotations for Multiple Engineering viewpoints in Computer Aided Design", University of Bath, May 2012.*

Viren Samdadia, "Integration of 3 Dimensional Parametric Building Model with Geographic Information Systems", Worcester Polytechnic Institute, May 2004.*

Saad et al., "A computational model for synchronous collaborative design", AAAI Technical Report WS-93-07, 1993.*

Red, E., Jensen, G., Ryskamp, J., Mix, K. (2010). NXConnect: Multi-User CAx on a Commercial Engineering Software Application. Department of Mechanical Engineering, Brigham Young University.

Xu, Yue. (2010). A Flexible Context Architecture for a Multi-User GUI. Department of Mechanical Engineering, Brigham Young University, Dec. 2010.

Red, E., French, D., Hepworth, A., Jensen, G., Stone, B. (2014). Multi-User Computer-Aided Design and Engineering Software Applications. Cloud-Based Design and Manufacturing (CBDM), Springer International Publishing, Jan. 1, 2014, pp. 25-62.

* cited by examiner

USER DEFINED OBJECT PUSHER FOR MULTI-USER CAX ENVIRONMENT

BACKGROUND

This disclosure relates to computer-aided technologies (CAx), and more particularly, to the characterization of component designs in a computing environment.

CAx software is widely used across a number of industries and there are numerous providers of CAx software with substantially overlapping sets of features. CAx software is used to develop tools, parts, assemblies, structures and other components using a computer system during the design, analysis, and manufacturing phases, for example. CAx software may be used by a user or group of users to build, analyze, and manufacture complex elements. These CAx software applications are generally not compatible with one another and generally allow single users to manipulate the various designs. CAx software is typically restricted to a single user paradigm, wherein only a single user can edit a model or part file within a CAx software application at a time. The user must exit the file before another user is allowed to access it.

SUMMARY

A system for collaborating on a component according to an example of the present disclosure includes a computing device configured to execute a first multi-user CAx environment including a data module and an import module. The data module is configured to access a database relating to a component design. The component design relates to a group of function-based commands. The import module is configured to cause a user defined object to be imported into the first multi-user CAx environment in response to the user defined object being located based on an identifier. The user defined object relates to the component design.

A further embodiment of any of the foregoing embodiments includes an editing module configured to modify data relating to at least one parameter of a user defined feature. The user defined feature is generated in response to execution of the user defined object.

A further embodiment of any of the foregoing embodiments includes a display module configured to display data defining at least one aspect of the user defined feature in the first multi-user CAx environment.

In a further embodiment of any of the foregoing embodiments, the first multi-user CAx environment is configured to execute a first function set in a single user mode and a second function set in a multi-user mode. The database is configured to store data relating to the user defined object in a format common to at least one of the first and second function sets. Each of the first and second function sets is configured to characterize the component design.

A further embodiment of any of the foregoing embodiments includes a synchronization module configured to communicate data defining at least one aspect of the user defined object from the database to a second multi-user CAx environment in a format common to at least one of the first function set and the second function set.

In a further embodiment of any of the foregoing embodiments, the first function set and the second function set do not have any predefined functionality corresponding to the user defined object.

In a further embodiment of any of the foregoing embodiments, the user defined object relates to a native application programming interface operable to execute at least one command in the first function set.

A further embodiment of any of the foregoing embodiments includes a synchronization module configured to communicate data defining at least one aspect of the user defined object and the identifier between the first multi-user CAx environment and a second multi-user CAx environment configured to load the component design.

In a further embodiment of any of the foregoing embodiments, a first instance of the user defined object is stored in a first data storage device coupled to the first multi-user CAx environment, and a second instance of the user defined object is stored in a second data storage device coupled to the second multi-user CAx environment.

In a further embodiment of any of the foregoing embodiments, the database is configured to store one or more parameters of the user defined object.

A further embodiment of any of the foregoing embodiments includes a listening module configured to locate the user defined object in a data storage device according to the identifier.

In a further embodiment of any of the foregoing embodiments, the listening module is configured to receive the identifier from a second multi-user CAx environment configured to load the component design.

A further embodiment of any of the foregoing embodiments includes an export module configured to cause the data module to communicate data relating to the user defined object to a second multi-user CAx environment configured to load an instance of the component design.

A system for collaborating on a component according to an example of the present disclosure includes at least one database configured to store data relating to a component design in a memory storage device. The component design relates to a group of predetermined functions. A host server includes a processor configured to execute a host multi-user CAx environment. The host multi-user CAx environment has a synchronization module. The synchronization module is configured to communicate data relating to an identifier between at least two client multi-user CAx environments configured to access the at least one database. The identifier relates to a user defined object, a local instance of the user defined object accessible by each of the at least two client multi-user CAx environments.

In a further embodiment of any of the foregoing embodiments, the at least one database is configured to link the identifier to the component design.

In a further embodiment of any of the foregoing embodiments, one of the at least two client multi-user CAx environments is configured to cause at least one parameter of the user defined object to be stored in the at least one database.

In a further embodiment of any of the foregoing embodiments, one of the at least two client multi-user CAx environments is configured to execute a first function set in a single user mode and a second function set in a multi-user mode. Each of the first and second function sets operable to characterize the component design and the at least one database is configured to store at least one parameter of the user defined object in a format common to at least one of the first and second function sets.

In a further embodiment of any of the foregoing embodiments, the synchronization module is configured to communicate data relating to at least one parameter of the user defined object from the at least one database to each of the at least two client multi-user CAx environments in response to receiving the identifier.

A method for collaborating on a component according to an example of the present disclosure includes the steps of accessing a database relating to a group of function-based commands from a first multi-user CAx environment, locating a user defined object according to an identifier, causing the identifier to be communicated to a second multi-user CAx environment, and causing data defining at least one aspect of the user defined object to be imported into one of the first and second multi-user CAx environment. The user defined object relates to a component design. The component design relates to the group of functions-based commands, and the user defined object is distinct from each command in the group of functions-based commands.

A further embodiment of any of the foregoing embodiments includes communicating at least one parameter of the user defined object from the database to the second multi-user CAx environment.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
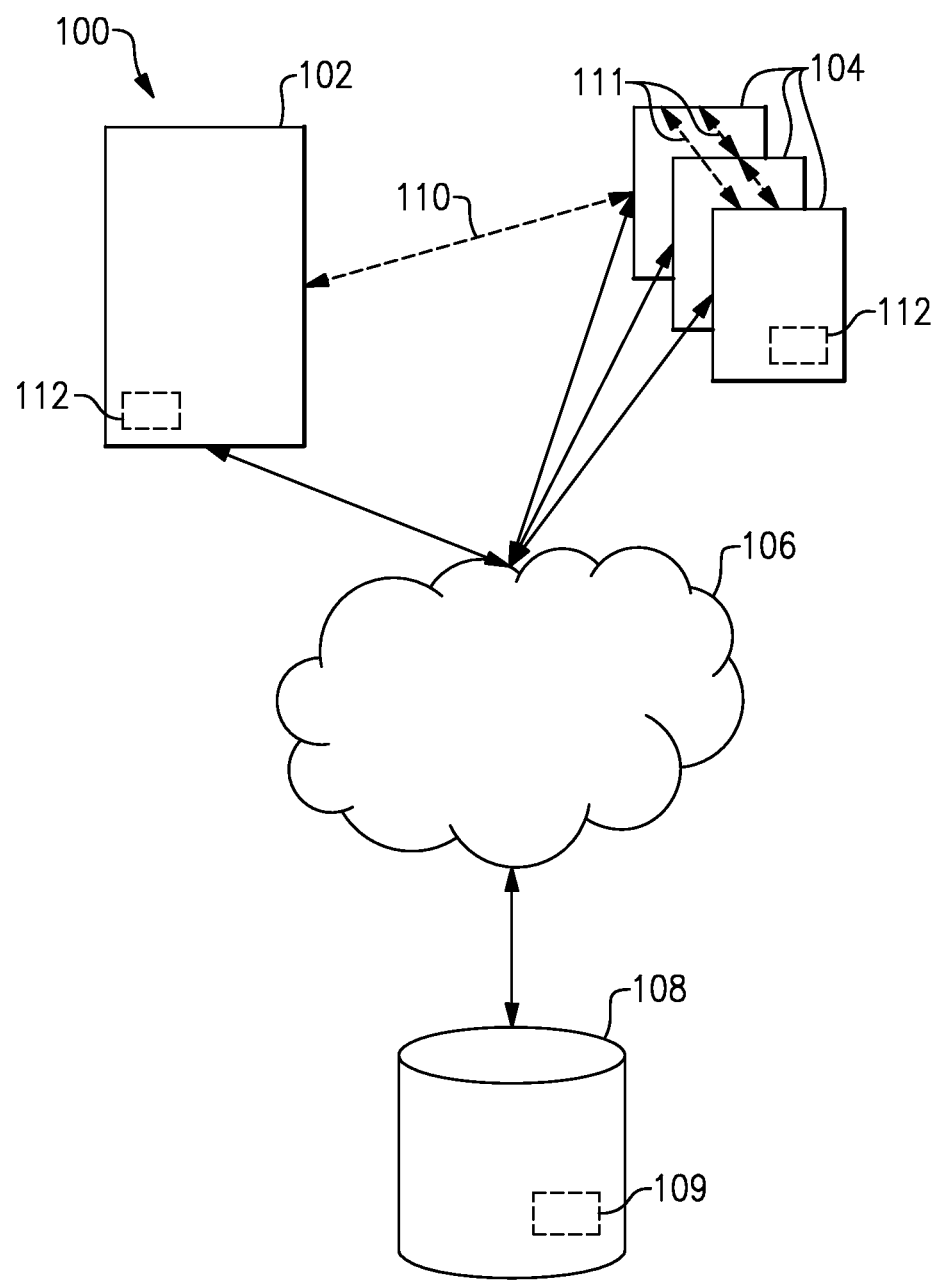
FIG. 1 illustrates a system for a multi-user CAx environment, according to an embodiment.

FIG. 1 illustrates a computing architecture or system 100 for executing a multi-user CAx environment, according to an embodiment. The system 100 includes a host computer 102. The host computer 102 may include one or more of a computer processor, memory, storage means, network device, and input and/or output devices and/or interfaces. The host computer 102 is configured to execute one or more software programs. In one embodiment, the host computer 102 is more than one computer jointly configured to process software instructions serially or in parallel.

In some embodiments, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device. In some embodiments, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some embodiments of collaboration between multiple CAx users, each of the client computers 104 is a user workstation capable of accessing and locally running CAx software and providing a CAx environment 112. In some embodiments, the CAx environment 112 is operable to perform one or more CAx functions including at least one CAx tool, including a computer-aided design (CAD), computer-aided engineering (CAE) and/or computer-aided manufacturing (CAM) tool, for example. In other embodiments, at least one of the client computers 104 is operable to execute different CAx functions. In some embodiments, the CAx environment 112 provides a display or visualization of a component design stored one or more part files, according to one or more visualization settings, and can be provided via one or more graphical user interfaces (GUI).

In some embodiments, the one or more client computers 104 are configured to communicate with the host computer 102 directly via a direct client interface 110 or over the network 106. The one or more client computers 104 are configured to execute one or more software programs, such as a CAx package. In some embodiments, the CAx package is configured to communicate with the host computer 102 either over the network 106 or directly through the direct client interface 110. In another embodiment, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some embodiments is operable to store or otherwise provide data to other computing devices. In one embodiment, the storage system 108 is a storage area network device (SAN) configured to communicate with the host computer 102 and/or the one or more client computers 104 over the network 106. In another embodiment, the storage system 108 is located within the host computer 102 or within at least one of the client computers 104. The storage system 108 may be configured to store one or more of computer software instructions, data, CAx files, database files, configuration information, etc.

In some embodiments, the system 100 is a client-server architecture configured to execute computer software on the host computer 102, which is accessible by the one or more client computers 104 using either a thin client application or a web browser executing on the one or more client computers 104. In some embodiments, the host computer 102 loads the computer software instructions from local storage, or from the storage system 108, into memory and executes the computer software using the one or more computer processors.

In some embodiments of the multi-user CAx architecture, each part file is stored within a database 109 at a central location, for instance at storage system 108. In another embodiment, the database 109 is stored at host computer 102 or is a distributed database provided by one or more of the client computers 104. In some embodiments, the database 109 is a relational database, and each part file in the database 109 is associated with a sub-assembly or assembly. In other embodiments, each feature, feature type, part, component design, sub-assembly and assembly corresponds to a unique identifier or database entry. In some embodiments, the database 109 is linked or otherwise corresponds to multiple part files. In an embodiment, the database 109 is configured to store data corresponding the component design one or more database records or entries, rather than linking or otherwise associating one or more part files to the database 109.

Each part file comprises one or more features, each feature corresponding to one or more feature types discussed below. In some embodiments, the part file includes a part tree or another data structure to organize and associate the features in a parent-child relationship between different features and/or part files. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" is defined as a geometric or non-geometric operation, or a result of such operation, available in a CAx tool to characterize a component design. The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, spatial position and orientation, body type such as a wireframe or solid, and/or its hierarchical relation to other features in a part tree, for example.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other embodiments, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types are contemplated including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions. Of course, many other feature types utilized to create and further define the various aspects of a component design are contemplated within the teachings of this disclosure.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

In some embodiments, the CAx environment 112 is configured to designate one or more features or feature types as a layer. Example layers include sketches, wireframes and solids, which in some embodiments are provided by the CAx software as default layer(s). In other embodiments, a user manually selects feature(s) and/or feature type(s) to be associated with at least one layer. In some embodiments, each layer is defined at system initialization, and in other embodiments, each layer is defined during operation. Each layer is utilized to filter the selected features or feature types in a part file loaded into the CAx environment.

Multiple users each provided with a CAx environment 112 via the client computers 104 are able to simultaneously access each part file stored in the database 109 and are able to view and modify various aspects of a component design corresponding to one or more part files. In some embodiments, the part file is stored locally at the storage system 108, with local copies of the part file at the client computers 104 being synchronized periodically. Modifications to each part file are communicated to each CAx environment 112 currently accessing the part file, either in real-time or periodically utilizing a synchronization scheme. Display or visualization of the modification is therefore made substantially immediately available in CAx environments 112 accessing the same part file, which can assist the multiple users in reducing, identifying/or and resolving conflicts or inconsistencies in various aspects of a component design, thereby ensuring that a particular design intent is met.

In some situations, the multiple users who use a CAx environment 112 are assigned with different level(s) of access to the component design via a user profile. For example, the component design, or various aspects of the component design including the feature(s) or feature type(s), can be associated with one or more of the level(s) of access. In some embodiments, different levels of access are designated for users that are restricted from access due to export controls, security classification or proprietary restrictions. Other restricted and unrestricted levels of access are contemplated in this disclosure, including job disciplines and organization structures, for embodiment. Accordingly, it may be desirable to limit access to aspects of a component design depending on the level(s) of access provided to a particular user profile. In some embodiments, each user profile corresponds to one or more access lists setting the level(s) of access for each user profile.

Figure 2A:
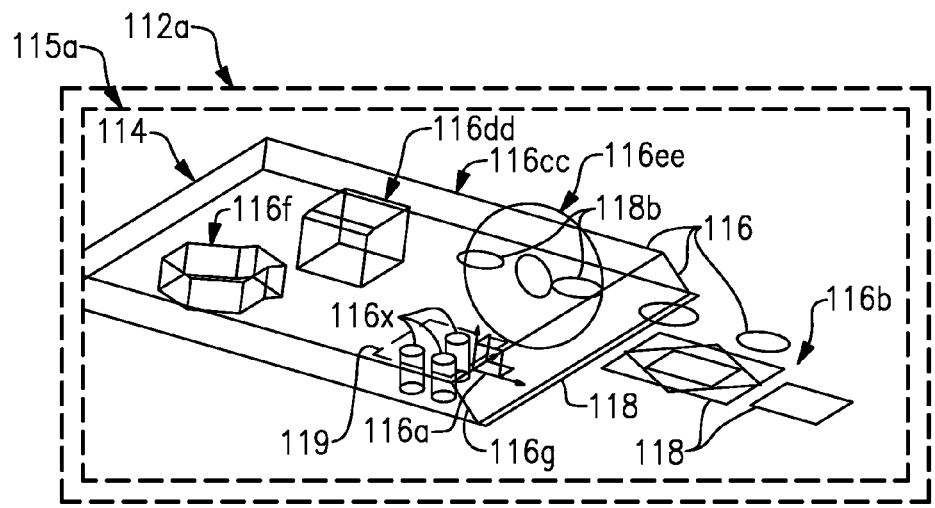
FIG. 2A illustrates a sample component design displayed in a first CAx environment, according to an embodiment.
Figure 2B:
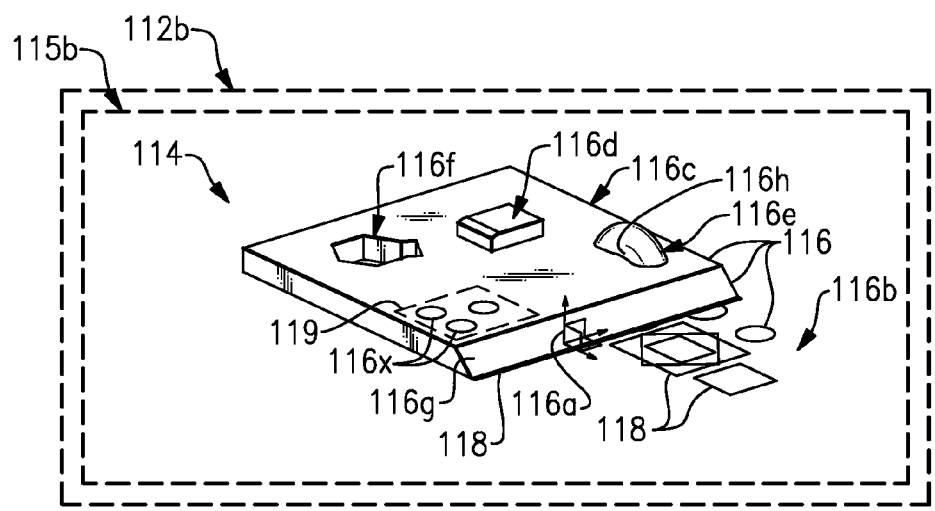
FIG. 2B illustrates the sample component design of FIG. 2A displayed in a second CAx environment, according to an embodiment.

FIGS. 2A-2B illustrate one embodiment in which two users collaborate on various aspects of a component design 114. In this embodiment, a first user is provided with a first CAx environment 112a, and a second user is provided with a second CAx environment 112b, shown in FIGS. 2A-2B respectively. Each of the CAx environments 112a, 112b is associated with a different one of the client computers 104, for example.

The sample component design 114 includes one or more features 116 each corresponding to a feature type. The features 116 shown in FIG. 2A include a datum coordinate system 116a, and a sketch 116b having one or more sketch entities or geometries 118 illustrated as ellipses and rectangles, for example. Some features 116 shown in FIG. 2B include solids such as extrudes 116c, 116d, which are applied to geometries 118 of the sketch 116b and are characterized by wireframes 116cc, 116dd shown in FIG. 2A. Other example features include a hole or Boolean 116f forming an opening in the extrude 116c, and a chamfer 116g applied to extrude 116c. Non-geometric features include surface shading 116h (shown in FIG. 2B) applied to the rotate 116e feature.

Each of the multiple users is able to select one or more visualization settings to characterize the display of the component design 114 in a viewing frustum 115 provided by a CAx environment 112 based on the particular situation, as illustrated in FIGS. 2A-2B. For the purposes of this disclosure, the term "visualization setting" means data corresponding to one or more features, feature types, layers or other parameters which can be utilized to display a component design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112a, 112b. As illustrated by the CAx environment 112a in FIG. 2A, the user has selected one or more visualization settings to show the wireframe geometries 116cc, 116dd, 116ee and to hide the corresponding solid features 116c, 116d, 116e. In the CAx environment 112b shown in FIG. 2B, the user has selected one or more visualization settings to show solid features 116c, 116d, 116e and to hide wireframes 116c, 116d, 116f, for example. The visualization settings of each CAx environment 112 can be customized according to the needs of a particular situation even though each of the users is working on the same component design 114.

A user provided with a multi-user CAx environment 112 may desire to characterize various aspects of a component design 114 in a manner not previously defined or otherwise provided in the CAx environment 112. The user may therefore create one or more user defined objects (UDOs) at various locations in the multi-user CAx system 100 operable to characterize various aspects of a component design 114, thus achieving a new state. The user may also desire to share data relating to the UDOs 120 (shown in FIG. 3) with one or more other CAx environments 112 to synchronize local instances of the component design 114 in the multi-user CAx system 100. The term "user defined object" (UDO) refers to one or more commands or operations that are defined, created or designated by a designer or user of a CAx environment that does not have corresponding predefined function call(s) or functionality in a CAx tool, application programming interface (API), library or instruction set accessible by or otherwise provided with a CAx environment, and any related data or a result of its operation.

In one illustrative embodiment, the example UDO 120 includes functionality operable to generate a set of passages 116x (shown in FIGS. 2A-2B) based upon input parameters such as designating a surface area 119 and a desired quantity of passages, for example. In another illustrative embodiment, the additional capability provided by the UDO 120 is a density model or algorithm operable to calculate a density of a particular base feature 116.

Each UDO 120 is associated with, or otherwise related to, an identifier 122 which can be utilized to locate the UDO 120, as discussed in detail below. The identifier 122 can include, but is not limited to, a text string, tag, identification code, logical name, network location or address, or the like, uniquely identifying the UDO 120 in the multi-user system 100. In one embodiment, the identifier 122 is at least a portion of a text file or the like. In another embodiment, the identifier 122 is stored in a header or metadata of a file storing functionality of the UDO 120. In alternative embodiments, the identifier 122 is communicated in a message or is stored to a common data or memory location such as database 109.

In some embodiments, the UDO 120 is operable to generate output, which may be provided to an output file, or a window or graphic in the viewing frustum 115, for example, based upon one or more parameters 124. In some embodiments, the UDO 120 is operable to generate one or more user defined features 116 of a component design 114 based upon one or more parameters or attributes 124. The parameters 124 can include, but are not limited to, spatial coordinates, dimensions, or a reference to a base feature 116 or component design 114. In other embodiments, the UDO 120 is operable to characterize non-geometric attributes or aspects of a component design 114. The parameter(s) 124 can be provided or set during creation or loading of the UDO 120, in which the user may be prompted to specify the parameter(s) 124 through interaction with a dialogue or GUI, for example. Utilizing the techniques discussed below, one or more users provided with a multi-user CAx environment 112 can characterize various aspects of a component design in an efficient manner by sharing or reusing UDOs 120, while remaining synchronized during a multi-user collaborative session.

Figure 3:
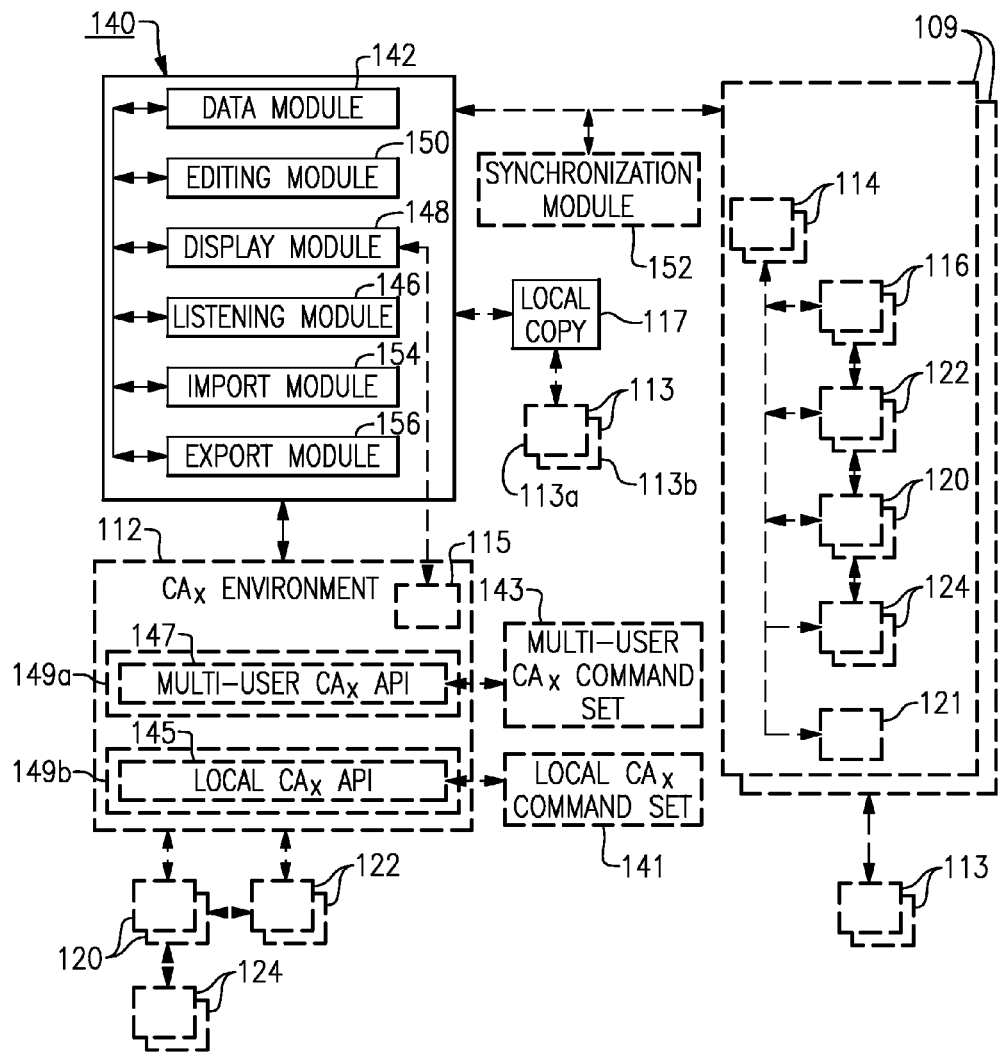
FIG. 3 illustrates a system for characterizing a component design with user defined objects, according to an embodiment.

FIG. 3 illustrates a CAx package 140 for characterizing a component design 114 with one or more UDOs 120, such as UDOs between CAx environments 112a, 112b shown in FIGS. 2A-2B, according to an embodiment. The CAx package 140 is configured to communicate various data between one or more CAx environments 112 such that each of the CAx environments 112 is able to create, edit, display and/or otherwise interact with one or more UDOs 120.

In some embodiments, the CAx package 140 is provided as a portion of a CAx software tool integrated into, or integrated with, a CAx environment 112. In other embodiments, the CAx package 140 is a standalone software program and is configured to interface with a CAx software tool to provide the desired solution. The CAx package 140 can be provided by a tangible or non-transitory computer-readable storage medium and installed at one or more of the client computers 104 and/or the host computer 102, for example. The CAx package 140 includes one or more modules operable to access, store and/or display data corresponding to one or more component designs 114. Each of these modules includes executable software instructions and/or digital or analog hardware circuitry.

The CAx package 140 includes a data module 142 configured to access, retrieve and/or store data relating to one or more component designs 114. In some embodiments, the data is stored in the database 109 as one or more tables, records or entries. In other embodiments, the data is stored in one or more part files 113 and is accessible by referencing one or more objects or memory locations referenced by the one or more records or entries. In one embodiment, each part file 113 or record includes data corresponding to at least one feature 116, such as any of the feature types discussed in this disclosure. In other embodiments, each database 109 organizes the data in one or more tables that include a list of part files 113 linked to a list of features 116 corresponding to a component design 114 and/or part file 113, for example.

In some embodiments, the data module 142 is configured to create a local copy 117 of the data, which is updated or synchronized with modifications to various aspects of the component design 114 periodically or in real-time utilizing various techniques. In one embodiment, the local copy 117 includes one or more part files 113. In another embodiment, the local copy 117 includes separate part files 113, such as part files 113a, 113b, in different data formats.

In some embodiments, the data module 142 is configured to cache data such that accessing the database 109 does not cause data corresponding to additions or changes to the component design(s) 114 and/or corresponding feature(s) 116 in the local copy 117 to update unless at least one predefined condition is met, such as the utilization of a checkpoint or timestamp set for the corresponding component design(s) 114, for example. In other embodiments, the data module 142 is configured to reload the local copy 117 with data from the database 109 when the at least one predefined condition is met.

In some embodiments, the CAx package 140 includes a display module 148 configured to display data corresponding to one or more component designs 114 and/or features 116 within a viewing frustum 115, such as in one of the viewing frustums 115a, 115b shown in FIGS. 2A-2B. In one embodiment, the display module 148 is configured to display data according to the local copy 117. The display module 148 can be configured to selectively display one or more graphical user interfaces (GUIs) operable to perform various CAx functions provided by the CAx environment 112 and related CAx tools, including the creation, editing or deletion of various aspects of a component design 114. The GUIs may be organized according to the needs of a particular situation in accordance with the teachings herein.

In some embodiments, the CAx package 140 includes an editing module 150 configured to generate or edit data corresponding to the component design 114. In further embodiments, the editing module 150 selectively causes the data module 142 to communicate data relating to a component design 114 between the CAx environment 112 and the database 109 such that user(s) are able to view, create or edit various aspects of the component design 114 within the CAx environment 112 in a collaborative manner. In one embodiment, the editing module 150 is configured to selectively cause the data module 142 to store the data to and/or from the local copy 117.

The editing module 150 is configured to interface with various aspects or functionality of the CAx environment 112 to create, edit or otherwise characterize a component design 114, including UDOs 120 and other data defining at least one aspect of, or that is otherwise related to, the UDOs 120 such as identifier(s) 122 or parameter(s) 124. In some embodiments, the CAx environment 112 is based upon, or is integrated or interfaces with, a CAx software tool such as CATIA, Autodesk®, Solidworks®, Autocad®, or the like. Existing CAx software tools, such as those listed previously, include one or more proprietary, native or local commands or instructions in a native or local CAx command set 141. The native commands are operable to generate, create or edit one or more features 116 of a component design 114 locally in the CAx environment 112.

The CAx environment 112 includes, integrates, interfaces with, or is otherwise provided with, one or more global commands in a multi-user CAx command set 143 to collaborate with other CAx environments 112 in a multi-user system such as CAx system 100. The term "global command" refers to a command available to a CAx environment that can be utilized to collaborate in a multi-user CAx system. In some embodiments, the multi-user CAx command set 143 is mapped to the local CAx command set 141 such that calls to one or more global commands causes one or more corresponding native commands to execute in the CAx environment 112, or vice versa. In further embodiments, the CAx environment 112 interfaces with the local CAx command set 141 via a local CAx application programming interface (API) 145 and interfaces with the multi-user CAx command set 143 via a multi-user CAx API 147, although other arrangements may be utilized. Each command set 141, 143 and/or API 145, 147 can be programmed in the CAx software directly, provided as one or more software libraries, executables or plug-ins adapted to work with the native CAx software or tool, or provided in a standalone program to interface with the CAx environment 112 to provide the desired solution.

In some embodiments, the CAx environment 112 is configured to execute in at least a multi-user mode and a single-user mode. In the multi-user mode, the editing module 150 is configured to cause at least one command in the multi-user CAx command set 143 to execute to characterize a component design 114, which may cause one or more native or local commands to execute. In the single-user mode, the editing module 150 is configured to cause at least one native or local command in the local CAx command set 141 to execute, thereby creating, editing or otherwise characterizing one or more aspects of a component design 114. In some embodiments, data generated by execution of one or more local commands is not compatible with the arrangement of the database 109, the multi-user CAx command set 143 and/or the multi-user CAx API 147. In this manner, data generated by execution of the local commands is not synchronized between each CAx environment 112 accessing the component design in the database 109.

In some embodiments, UDO 120 is created utilizing one or more commands in the local CAx API 145. The designer programs the UDO 120 to provide customized functionality that is compatible with the local CAx API 145 but is not predefined or otherwise provided by the local or multi-user CAx APIs 145, 147. In one embodiment, the local CAx API 145 supports a generic feature type which provides the designer a construct to program the customized functionality of a UDO, based on one or more attributes, parameters or other basic definition of the generic feature type being set or otherwise indicated. The designer may compile the UDO 120 into one or more executable files, libraries or the like, which can then be referenced by the local CAx API 145 to load the UDO 120 into the CAx environment 112 from a local data storage device, for example. In some embodiments, the local CAx API 145 or multi-user CAx API 147 includes various commands to characterize or further define UDOs 120, such as setting or otherwise indicating various parameters 124 including, but not limited to, geometry, location, orientation, etc., to create or define one or more user defined features 116.

In some embodiments, the CAx environment 112 executes two or more threads 149 in a multi-user mode to provide the desired solution, including a multi-user CAx thread 149a executing functionality made available by the multi-user CAx API 147 and a local thread 149b executing functionality made available by the local CAx API 145 or executing the local or native CAx tool. In some embodiments, the multi-user CAx API 147 is configured to share data between the threads 149a, 149b based on a scheduling scheme or various events such as mouse clicks and the like. The threads 149 may share data utilizing various inter-process communications protocols (IPC), for example. In this manner, the UDO 120 may not be recognized or captured by the multi-user CAx thread 149a when the UDO 120 is loaded into the CAx environment 112 by the local thread 149b since the generic feature type or UDO 120 does not have a corresponding command or related event handling functionality in the multi-user CAx API 147. Accordingly, the UDO 120 may not be synchronized between each CAx environment 112 collaborating on the component design 114.

In some embodiments, the CAx package 140 includes a listening module 146 configured to locate a UDO 120 relating to an identifier 122. The identifier 122 can be communicated or otherwise provided to the listening module 146 utilizing various techniques. In one embodiment, a user interacts with one or more dialogues or GUIs in the CAx environment 112 to indicate or specify the identifier 122. In other embodiments, the identifier 122 is provided to the listening module 146 during creation or loading of data relating to the UDO 120, or in response to storing data relating to the UDO 120 on a local memory storage device, for example. In alternative embodiments, another client CAx environment 112 or a host multi-user CAx environment 112 causes the identifier 122 to be communicated to the listening module 146. In some embodiments, the identifier 122 is communicated in a message between threads 149 executing functions relating to the local and multi-user CAx APIs 145, 147.

Various techniques for locating a UDO 120 can be utilized. In one embodiment, the listening module 146 searches for a UDO 120 associated with an identifier 122 periodically, and in another embodiment, the listening module 146 searches for the UDO 120 associated with the identifier 122 in response to an event such as the user interacting with one or more dialogues or GUIs in the CAx environment 112 or the like. In one embodiment, the listening module 146 is operable to search or query files or other data in a local memory storage device for the UDO 120 utilizing various function calls provided by the file system, for example. In another embodiment, the listening module 146 is operable to search or query a database 109 for one or more record entries relating to the UDO 120.

In some embodiments, the CAx package 140 includes an import module 154 configured to import or load one or more UDOs 120 into the CAx environment 112. In further embodiments, the import module 154 imports or loads the UDO 120 using one or more commands in the local or multi-user CAx APIs 145, 147. The import module 154 is configured to cause the UDO 120 to be imported or loaded in response to the listening module 146 locating a UDO 120 in a local data storage device or in a related entry in the database 109, for example.

In some embodiments, the CAx package 140 includes an export module 156 configured to cause the data module 142 to push or otherwise communicate data relating to one or more UDOs 120 to one or more data storage devices or memory locations associated with another CAx environment 112 or the database 109 such that the UDO 120 functionality is made available to other CAx environments 112. In one embodiment, the data is an executable file or library which may be called or instantiated by another CAx environment 112 from a data storage device storing an instance or copy of the UDO 120, although any of the techniques discussed herein can be utilized. In other embodiments, the export module 156 is operable to cause the UDO 120 to be exported using one or more commands in the local or multi-user CAx APIs 145, 147.

In some embodiments, the export module 156 is configured to cause the data module 142 to push or otherwise communicate the UDO 120 in response to the listening module 146 locating the UDO 120. In alternative embodiments, the export module 156 is configured to cause the data module 142 to push or otherwise communicate the UDO 120 in response to the UDO 120 being loaded into the CAx environment 112. In one embodiment, the user is able to interact with one or more dialogues or GUIs in the CAx environment 112 to cause the UDO 120 to be exported, pushed or otherwise communicated to another CAx environment 112 or the database 109. The user can indicate, for example, an identifier 122 for the listening module 146 to locate on one or more local memory storage devices or memory locations. In another embodiment, the user manually locates the UDO 120 to be exported.

In some embodiments, the export module 156 is configured to cause the data module 142 to communicate data relating to the identifier 122 or the parameter(s) 124 to another CAx environment 112 or to the database 109 for later retrieval. In other embodiments, a host multi-user CAx environment or multi-user CAx server such as host server 102 (shown in FIG. 1) is operable to propagate or otherwise communicate data relating to the identifier 122 or parameter(s) 124 to each CAx environment 112 collaborating on the component design 114 or connected to the multi-user system 100, for example.

The identifiers 122 and parameter(s) 124 can be communicated utilizing various techniques. In one embodiment, the identifiers 122 or parameter(s) 124 are communicated concurrently with a related UDO 120, and in another embodiment, are communicated as one or more separate messages. UDOs 120, identifiers 122 and parameters 124 can be communicated between the CAx environments 112 or the database 109 utilizing various communications protocols, such as User Datagram Protocol (UDP), Transmission Control Protocol/Internet Protocol (TCP/IP), or other network communication protocols (JSON, XML, SOAP, etc.), for example.

Various techniques for storing data relating to UDOs 120 can be utilized, including various data formats, based on the needs of a particular situation. In some embodiments, the identifiers 122 or parameters 124 are stored in the database 109 in a native format common with the local CAx command set 141 and/or API 145. In this arrangement, each CAx environment 112 provided with the local CAx command set 141 and/or API 145 is able to generate, edit or load the UDO 120 or related user defined feature(s) 116, even if other CAx environments 112 in the multi-user system 100 are unable to do so. In alternative embodiments, the data is stored in the database 109 in a database format, which may be a global format common with the multi-user CAx command set 143 and/or API 147. A table element containing the UDO 120 information may be created within the model database 109 to hold the data for future use. In other embodiments, the database 109 is configured to link a file storing data relating to the UDO 120 to a table entry, such as a related user defined feature 116 or a component design 114 stored in the database 109. In some embodiments, the UDO 120 or related parameter(s) 124 can be queried in the database 109 utilizing the identifier 122.

In some embodiments, the data module 142 interfaces or otherwise communicates with a synchronization module 152 configured to communicate data relating to one or more UDOs 120 to one or more CAx environments 112 collaborating on a component design 114, including related identifier(s) 122 or parameter(s) 124. In another embodiment, the synchronization module 152 is configured to cause data defining at least one aspect of, or that is otherwise related to, the UDOs 120 to replicate to one or more local data storage devices accessible by the client CAx environment(s) 112 connected to the multi-user CAx system 100 or database 109, which in one embodiment occurs in response to the synchronization module 152 receiving the identifier 122 or other information related to the UDO 120.

In some embodiments, the synchronization module 152 is configured to cause a portion of the multi-user CAx command set 143 or API 147 to update in response to data relating to one or more UDOs 120 being pushed or replicated. In one embodiment, the synchronization module 152 is configured to cause a list 121 of function types or function-based commands to update, thereby indicating to the user that the functionality of a particular UDO 120 is available in the CAx environment 112. In this manner, the user is able to interact with the CAx environment 112 to instantiate or reuse the UDO 120, such as causing one or more UDOs 120 to execute to generate new user defined feature(s) 116, for example. In some embodiments, the CAx package 140 includes at least a portion of the synchronization module 152.

In some embodiments, the data module 142 is configured to selectively load the UDO 120 or related feature(s) 116 into the CAx environment 112 in response to the listening module 146 locating a UDO 120 relating to a particular identifier 122 being communicated by another CAx environment 112. In one embodiment, the data module 142 is configured to selectively reload the component design 114 or local copy 117 in response to the listening module 146 locating a UDO 120. In another embodiment, the data module 142 is configured to selectively reload the component design 114 or local copy 117 in response to data defining at least one aspect of, or is otherwise related to, a UDO 120, such as an identifier 122 linked to or otherwise associated with the UDO 120 and/or the component design 114, being stored in the database 109.

In some situations, a user provided with the CAx environment 112 edits or otherwise changes one or more parameters 124 relating to a UDO 120 after the UDO 120 is loaded in the CAx environment 112. In some embodiments, data relating to the parameter(s) 124 is synchronized or otherwise communicated to other CAx environments 112 by pushing or otherwise communicating the related identifier 122 from the CAx environment 112, thereby causing other CAx environments 112 to attempt to locate a related UDO 120 and reload the UDO 120 based on the updated parameter(s) 124. Data relating to the UDO 120 or parameter(s) 124 is pushed or communicated to other CAx environments 112 utilizing any of the techniques discussed herein, thereby synchronizing the component design 114 in each of the CAx environments 112 in the multi-user CAx system 100.

Figure 4:
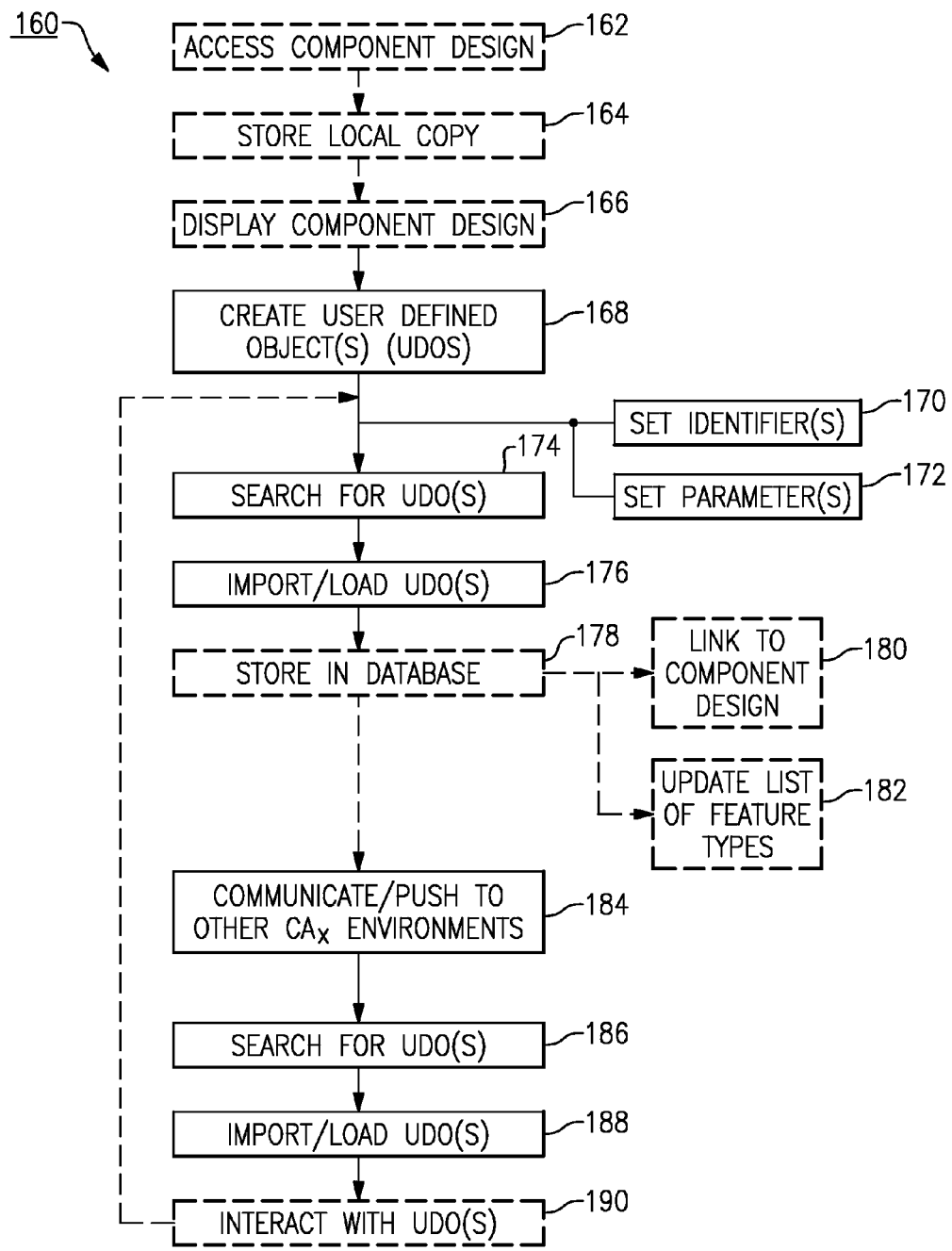
FIG. 4 illustrates an algorithm for characterizing a component design with user defined objects, according to an embodiment.

FIG. 4 illustrates a flowchart as an algorithm 160 for sharing or pushing user defined objects, utilizing any of the techniques described in this disclosure and the CAx package 140 shown in FIG. 3, according to an embodiment. In some embodiments, the algorithm 160 is executed at least in part within a multi-user CAx environment, such as one of the CAx environments 112a, 112b shown in FIGS. 2A-2B, or a CAx host computer and/or server 102.

In some embodiments, a CAx environment accesses data corresponding to a component design from at least one database at block 162, and stores a local copy of the data at block 164. The CAx environment may display data corresponding to the component design according to the local copy, for example, at block 166.

One or more UDOs are created and stored in a local memory storage device accessible by the CAx environment at block 168. The UDOs can include, but are not limited to, any of the UDOs discussed herein. An identifier relating to the UDO is set or designated at block 170. In some embodiments, one or more parameters relating to the UDO are set or designated at block 172.

The algorithm 160 searches for the UDO relating to the identifier at block 174. The UDO is imported or loaded into the CAx environment in response to locating the UDO relating to the identifier at block 176. In some embodiments, the UDO is imported or loaded into the CAx environment according to the parameter(s) being set or otherwise indicated at block 172. The parameters can be set or designated before or after the UDO is imported or loaded into the CAx environment.

In some embodiments, data relating to the UDOs, identifier and/or parameter(s) is stored in the database at block 178. In further embodiments, the data is linked to, or otherwise associated with, a component design or a particular user defined feature relating to the UDO at block 180. In some embodiments, a list of feature types or predefined functions supported by, or otherwise available to, the CAx environment is updated to include a reference to the UDO at block 182.

The UDO, identifier and/or parameter(s) are communicated to other CAx environments or related memory storage devices at block 184. The other CAx environment(s) search for the UDO in response to receiving the identifier related to the UDO at block 186. Other CAx environments import or load the UDO at block 188 in response to locating the UDO relating to the identifier in a local memory storage device or the database, for example. Each CAx environment is able to interact with various aspects of the UDO, including viewing or editing aspects of the UDO or a related user defined feature, at block 190. A user interacting with the CAx environment may modify or update one or more parameters relating to the UDO. This may cause the UDO or parameter(s) to be pushed or exported to the database or other CAx environments or the database utilizing any of the techniques previously discussed, thereby synchronizing local instances of the component design in a collaborative manner.

The algorithm 160 can programmed in the CAx software directly, provided as one or more software plug-ins adapted to work with the native CAx software, or provided in a standalone program to interface with a CAx package to provide the desired solution. While the CAx package 140 and the algorithm 160 are described above in the context of a multi-user CAx environment executed on at least one host computer 102 or client computer 104, it should be understood that other CAx tools and architectures may benefit from the teachings herein. It should also be understood that the host computer 102, client computer 104 or another computing device running a multi-user CAx environment 112 can be programmed with multiple additional tools, and the various features and tools included can be configured to interoperate with each other according to known principles. The specific UDO functionality may be programmed at each location shown in FIG. 3 to support the creation, importation, exportation, communication and/or storage of UDOs.

Although the above embodiments illustrate a specific component, embodiments of this disclosure are not limited to those particular combinations. One skilled in the art having the benefit of this disclosure will recognize that it is possible to use some of the components or features from one of the embodiments in combination with features or components from another one of the embodiments. Furthermore, various embodiments may include one or more embodiments within them, while other embodiments may include a different subset of embodiments. In addition, it will be understood that in various embodiments, a module may be a single module, or in some embodiments, the function of a single module may incorporate the features of multiple modules.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for collaborating on a component, comprising:
    a computing device configured to execute a first multi-user CAx environment including a data module and an import module;
    wherein the data module is configured to access a database relating to a component design, the component design relating to a group of function-based commands;
    wherein the import module is configured to cause a user defined object to be imported into the first multi-user CAx environment in response to the user defined object being located based on an identifier, the user defined object relating to the component design;
    wherein the first multi-user CAx environment is configured to execute a first function set in a single user mode and a second function set in a multi-user mode; and
    wherein the database is configured to store data relating to the user defined object in a format common to at least one of the first and second function sets, each of the first and second function sets configured to characterize the component design; and
    wherein the first function set and the second function set do not have any predefined functionality corresponding to the user defined object.

2. The system as recited in claim 1, further comprising an editing module configured to modify data relating to at least one parameter of a user defined feature, and wherein the user defined feature is generated in response to execution of the user defined object.

3. The system as recited in claim 2, further comprising a display module configured to display data defining at least one aspect of the user defined feature in the first multi-user CAx environment.

4. The system as recited in claim 2, further comprising a synchronization module configured to communicate data relating to the user defined feature from the database to a second multi-user CAx environment in a format common to at least one of the first function set and the second function set.

5. The system as recited in claim 4, wherein the user defined feature is a geometric feature of the component design.

6. The system as recited in claim 1, further comprising a synchronization module configured to communicate data defining at least one aspect of the user defined object from the database to a second multi-user CAx environment in a format common to at least one of the first function set and the second function set.

7. The system as recited in claim 1, wherein the user defined object relates to a native application programming interface operable to execute at least one command in the first function set.

8. The system as recited in claim 1, further comprising a synchronization module configured to communicate data defining at least one aspect of the user defined object and the identifier between the first multi-user CAx environment and a second multi-user CAx environment configured to load the component design.

9. The system as recited in claim 8, wherein a first instance of the user defined object is stored in a first data storage device coupled to the first multi-user CAx environment, and a second instance of the user defined object is stored in a second data storage device coupled to the second multi-user CAx environment.

10. The system as recited in claim 9, wherein the database is configured to store one or more parameters of the user defined object.

11. The system as recited in claim 1, comprising a listening module configured to locate the user defined object in a data storage device according to the identifier.

12. The system as recited in claim 11, wherein the listening module is configured to receive the identifier from a second multi-user CAx environment configured to load the component design.

13. The system as recited in claim 1, comprising an export module configured to cause the data module to communicate data relating to the user defined object to a second multi-user CAx environment configured to load an instance of the component design.

14. A system for collaborating on a component, comprising:
    at least one database configured to store data relating to a component design in a memory storage device, the component design relating to a group of predetermined functions;
    a host server including a processor configured to execute a host multi-user CAx environment, the host multi-user CAx environment having a synchronization module;
    wherein the synchronization module is configured to communicate data relating to an identifier between at least two client multi-user CAx environments configured to access the at least one database, the identifier relating to a user defined object, a local instance of the user defined object accessible by each of the at least two client multi-user CAx environments;
    wherein one of the at least two client multi-user CAx environments is configured to execute a first function set in a single user mode and a second function set in a multi-user mode; and
    wherein the at least one database is configured to store at least one parameter of the user defined object in a format common to at least one of the first and second function sets, each of the first and second function sets configured to characterize the component design; and
    wherein the first function set and the second function set do not have any predefined functionality corresponding to the user defined object.

15. The system as recited in claim 14, wherein the at least one database is configured to link the identifier to the component design.

16. The system as recited in claim 15, wherein one of the at least two client multi-user CAx environments is configured to cause the at least one parameter of the user defined object to be stored in the at least one database.

17. The system as recited in claim 14, wherein the synchronization module is configured to communicate data relating to the at least one parameter of the user defined object from the at least one database to each of the at least two client multi-user CAx environments in response to receiving the identifier.

18. A method for collaborating on a component, comprising the steps of:
- accessing a database relating to a group of function-based commands from a first multi-user CAx environment;
- locating a user defined object according to an identifier;
- causing the identifier to be communicated to a second multi-user CAx environment;
- causing data defining at least one aspect of the user defined object to be imported into one of the first and second multi-user CAx environments;
- wherein the user defined object relates to a component design, the component design relates to the group of functions-based commands, and the user defined object is distinct from each command in the group of functions-based commands;
- wherein the first multi-user CAx environment is configured to execute a first function set in a single user mode and a second function set in a multi-user mode; and
- wherein the database is configured to store data relating to the user defined object in a format common to at least one of the first and second function sets, each of the first and second function sets configured to characterize the component design; and
- wherein the first function set and the second function set do not have any predefined functionality corresponding to the user defined object.

19. The method as recited in claim 18, further comprising communicating at least one parameter of the user defined object from the database to the second multi-user CAx environment.

20. The method as recited in claim 19, further comprising causing a list of feature types supported by the first and second multi-user CAx environments to be updated to include a reference to the user defined object, each feature of the component design corresponding to a feature type of the list of feature types.

\* \* \* \* \*